(12) United States Patent
Yu et al.

(10) Patent No.: US 7,916,376 B2
(45) Date of Patent: Mar. 29, 2011

(54) PROJECTION SYSTEM AND OPTICAL ACTUATOR THEREOF

(75) Inventors: Ching-Hsiang Yu, Taoyuan Hsien (TW); Chia-Chi Wu, Taoyuan Hsien (TW); Fu-Mei Hsu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 304 days.

(21) Appl. No.: 12/145,130

(22) Filed: Jun. 24, 2008

(65) Prior Publication Data
US 2009/0147338 A1 Jun. 11, 2009

(30) Foreign Application Priority Data

Dec. 6, 2007 (TW) .............................. 96146458 A

(51) Int. Cl.
*G02B 26/08* (2006.01)

(52) U.S. Cl. .................................... 359/223.1

(58) Field of Classification Search ..... 359/223.1–226.1
See application file for complete search history.

(56) References Cited

U.S. PATENT DOCUMENTS 6,028,689 A * 2/2000 Michalicek et al. ....... 359/224.1
* cited by examiner

*Primary Examiner* — Euncha P Cherry
(74) *Attorney, Agent, or Firm* — Muncy, Geissler, Olds & Lowe, PLLC

(57) ABSTRACT

An optical actuator includes a base, a carrier, a reflecting optical element, a connecting structure and an actuating component. The reflecting optical element is disposed at a first side of the carrier. The connecting structure has a first connecting portion located at the central region thereof and two second connecting portions located at two opposite sides thereof. The connecting portions connect the base to the second side of the carrier. The actuating component is disposed on the base and drives the carrier rotating along an axial line. The axial line is substantially perpendicular to the connecting structure. A projection system including the optical actuator is also disclosed.

18 Claims, 5 Drawing Sheets

PROJECTION SYSTEM AND OPTICAL ACTUATOR THEREOF

CROSS REFERENCE TO RELATED APPLICATIONS

This Non-provisional application claims priority under 35 U.S.C. §119(a) on Patent Application No(s). 096146458 filed in Taiwan, Republic of China on Dec. 6, 2007, the entire contents of which are hereby incorporated by reference.

BACKGROUND OF THE INVENTION

1. Field of Invention

The present invention relates to a projection system and an actuator thereof. More particularly, the present invention relates to an optical actuator and a projection system using the optical actuator.

2. Related Art

In the projection system, an optical actuator is applied to increase pixels and image smoothness. The projection system includes an image generating device and a projecting lens module. The image generating device can generate the image by the technology of digital micro-mirror device (DMD), three liquid crystal panels or liquid crystal on silicon (LCoS) panel. Then, the projecting lens module helps to project the image on a screen. The optical actuator is disposed between the image generating device and the projecting lens module and is reciprocatingly rotated in high-frequency so as to achieve the function of increasing the pixels and image smoothness.

As shown in FIGS. 1A and 1B, a conventional optical actuator 10 includes a base 11, a carrier 12, a reflective mirror 13, axles 14 and a driver (not shown). The reflective mirror 13 is disposed on and connected to the carrier 12. The axles 14 are disposed at opposite sides of the carrier 12. The driver can drive the carrier 12 to rotate back and forth so that the reflective mirror 13 can be rotated back and forth along the axis X. According to the axles 14, the reflective mirror 13 can swing in a high-frequency within an angle θ so that the image can be transmitted to different positions through the reflective mirror 13. Due to the persistence of vision, the images can be overlapped so as to achieve the functions of increasing pixels and image smoothness.

However, since the axles 14 is overlapped or perpendicular to the axis X, the carrier 12 and the reflective mirror 13 can only be rotated along the axis X. Thus, the generated torque can make the axles 14 be easily deformed, which affects the image quality.

SUMMARY OF THE INVENTION

In view of the foregoing, the present invention is to provide an optical actuator, which has a connecting structure that is not easily deformed, and a projection system including the optical actuator for improving the stability of the image quality.

To achieve the above, the present invention discloses an optical actuator including a base, a carrier, a reflecting optical element, a connecting structure and an actuating component. The reflecting optical element is disposed at a first side of the carrier. The connecting structure has a first connecting portion located at a central region thereof and two second connecting portions located at two opposite sides thereof. The first connecting portion and the second connecting portions connect the base to the second side of the carrier. The actuating component is disposed on the base and drives the carrier rotating along an axial line, which is substantially perpendicular to the connecting structure.

In addition, the present invention also discloses a projection system including an optical actuator and a projecting lens module. The projecting lens module is disposed corresponding to the optical actuator. The reflecting optical element is disposed at a first side of the carrier. The connecting structure has a first connecting portion located at a central region thereof and two second connecting portions located at two opposite sides thereof. The first connecting portion and the second connecting portions connect the base to the second side of the carrier. The actuating component is disposed on the base and drives the carrier rotating along an axial line, which is substantially perpendicular to the connecting structure.

As mentioned above, the optical actuator of the present invention has a connecting structure, which includes a first connecting portion and two second connecting portions, for connecting the base and a second side of the carrier. Thus, the axial line of the carrier is substantially perpendicular to the connecting structure. Compared with the prior art, the connecting structure can withstand the torque of the rotating carrier so as to prevent the deformation as the conventional axles, thereby improving the stability of the image quality.

BRIEF DESCRIPTION OF THE DRAWINGS

The present invention will become more fully understood from the detailed description given herein below and accompanying drawings which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

First Embodiment

Figure 1A:
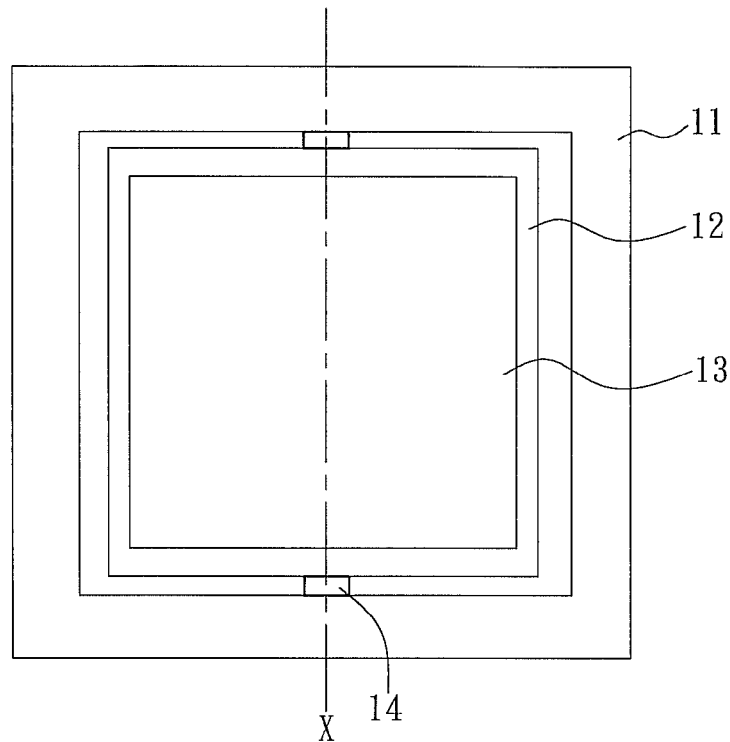
FIG. 1A is a schematic top view showing a conventional optical actuator.
Figure 1B:
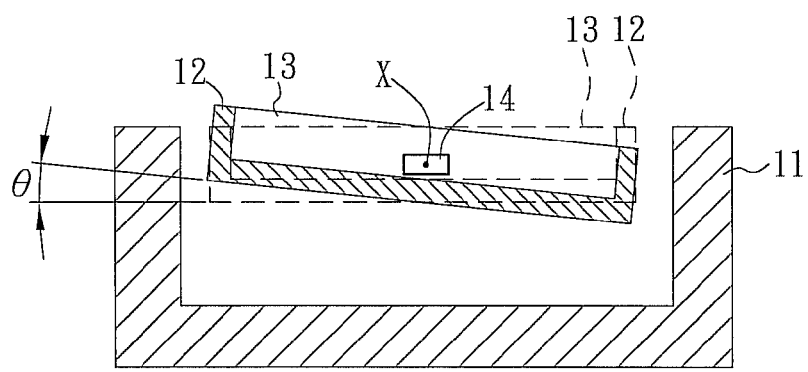
FIG. 1B is a schematic sectional view showing the conventional optical actuator.
Figure 2A:
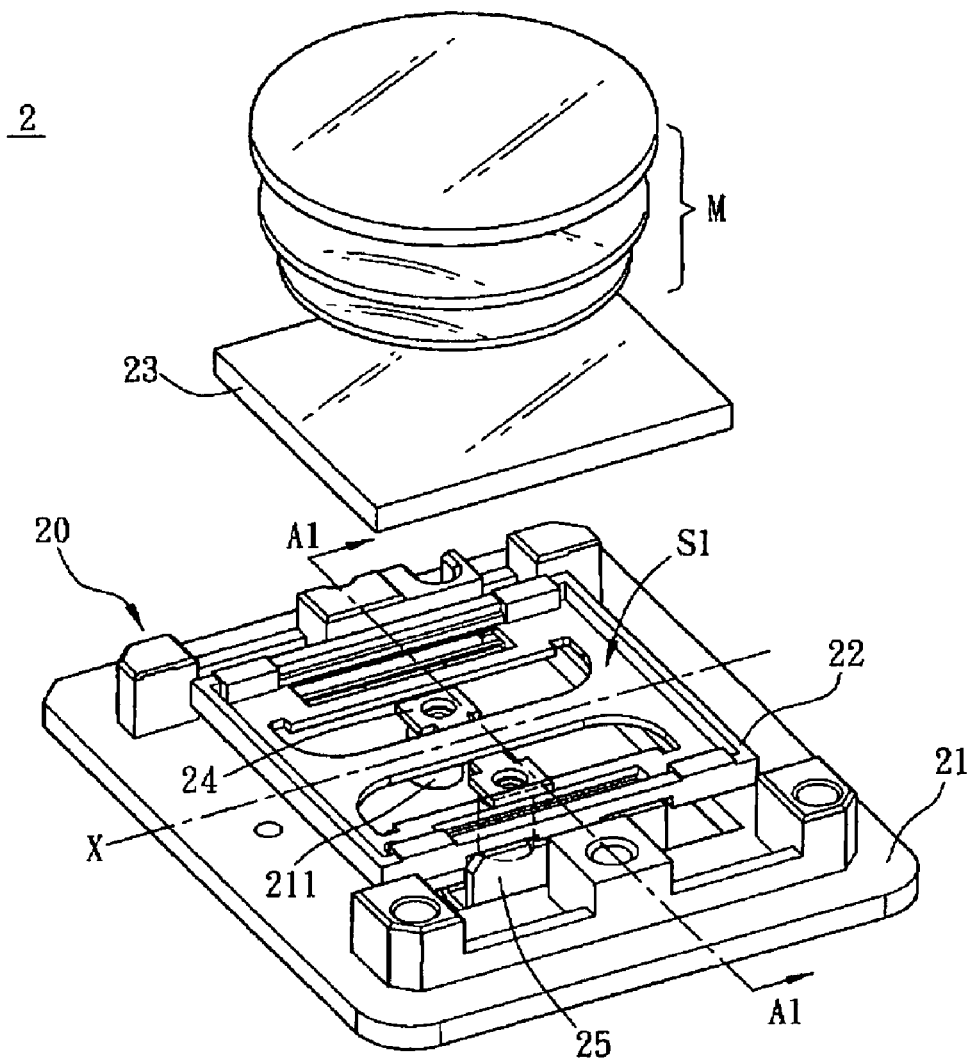
FIG. 2A is a schematic illustration showing a projection system and an optical actuator thereof according to a first embodiment of the present invention.
Figure 2B:
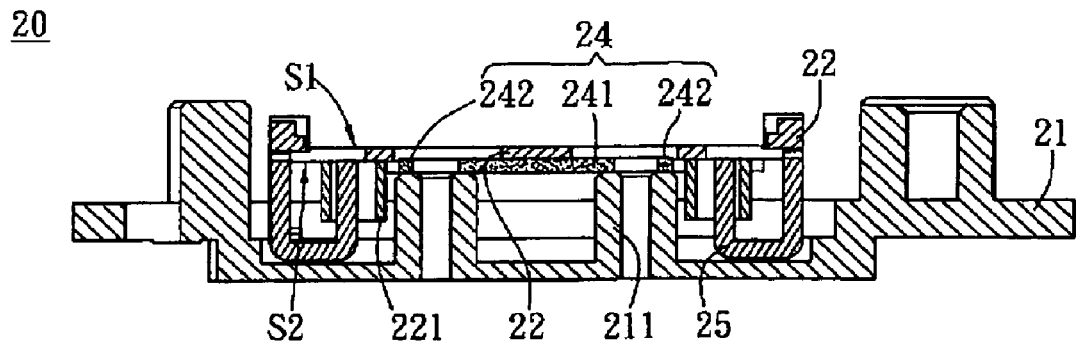
FIG. 2B is a sectional view of the optical actuator along a line A1-A1 of FIG. 2A.

With reference to FIGS. 2A and 2B, a projection system 2 according to a first embodiment of the present invention includes an optical actuator 20 and a projecting lens module M disposed corresponding to the optical actuator 20. In the embodiment, the projection system 2 can be a front projection system or a rear projection system.

The optical actuator 20 includes a base 21, a carrier 22, a reflective optical element 23, a connecting structure 24 and an actuating component 25. The reflecting optical element 23 can be a reflective mirror coated with a high-reflective film and is disposed at a first side S1 of the carrier 22. The connecting structure 24 is connected between the base 21 and a second side S2 of the carrier 22. The second side S2 is opposite to the first side S1. The connecting structure 24 has a first connecting portion 241 located at a central region thereof and two second connecting portions 242 located at two opposite sides thereof. In the embodiment, the base 21 has at least one protrusion 211 and the protrusion 211 supports the first connection portion 241. The carrier 22 and the connecting structure 24 are integrally formed as a monolithic piece. That is, the first connecting portion 241 and the carrier 22 are integrally formed as a monolithic piece. Of course, they can also be connected by adhering or screwing. In addition, the connecting structure 24 can be, for example but not limited to, a plate structure or an elastic piece. In the embodiment, the connecting structure 24 is a plate structure. The first connecting portion 241 is connected with the second side S2 of the carrier 22, and two second connecting portions 242 are screwed to the base 21. To be noted, the connecting structure 24 can be connected to the base by adhering or screwing, or they can be integrally formed as a monolithic piece.

The actuating component 25 can be, for example but not limited to, a voice coil motor (VCM) or a piezoelectric actuator (PZT) and is fixed to the base 21. In the embodiment, the actuating component 25 is disposed between the base 21 and the second side S2 of the carrier 22. In addition, the carrier 22 can further include a sensing component 221 disposed between the actuating component 25.

Figure 2C:
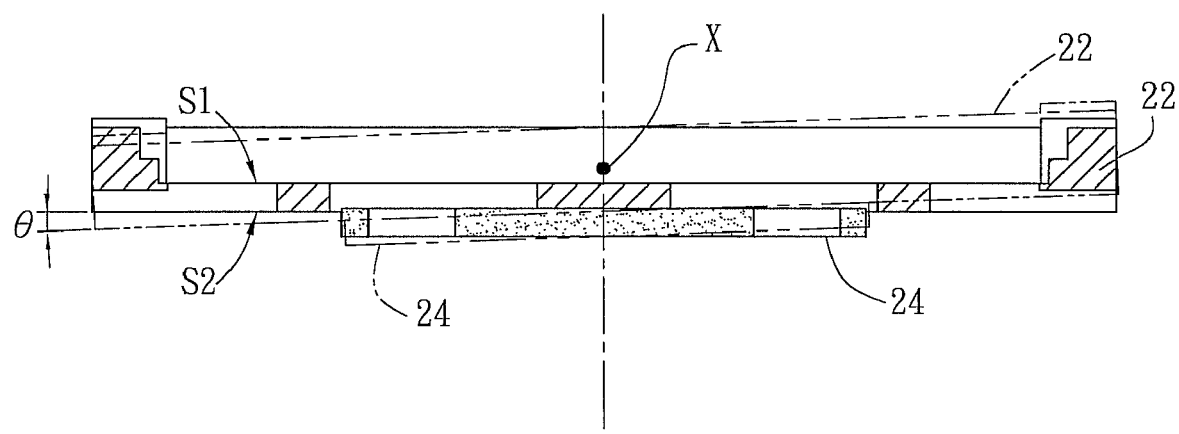
FIG. 2C is a schematic side view showing the rotation of the optical actuator of FIG. 2A.

Referring to FIG. 2C, the sensing component 221 senses and the actuating component 25 drives the carrier 22 so that the carrier 22 can rotate along an axial line X within an angle θ. To be noted, since the axial line X and the connecting structure 24 are substantially perpendicular to each other, the connecting structure 24 can not only support the carrier 22 but also carry out the rotation of the carrier 22.

Second Embodiment

Figure 3A:
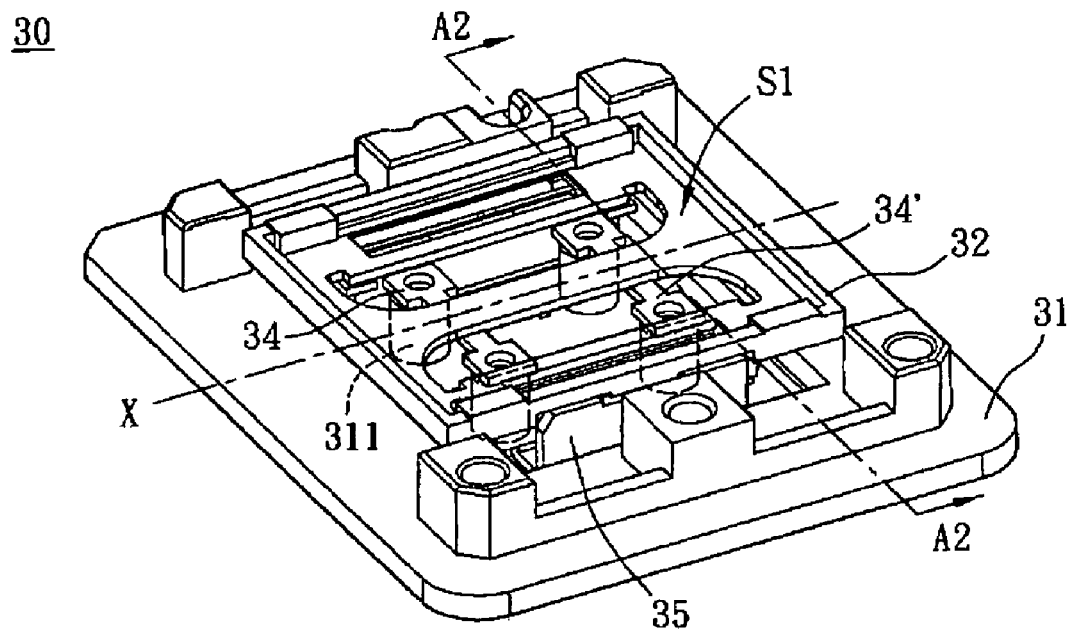
FIG. 3A is a schematic illustration showing an optical actuator according to a second embodiment of the present invention.
Figure 3B:
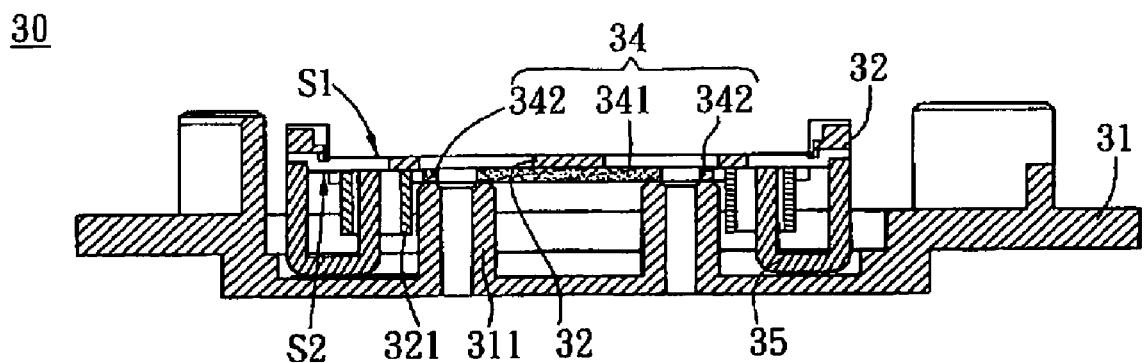
FIG. 3B is a sectional view of the optical actuator along a line A2-A2 of FIG. 3A.

With reference to FIGS. 3A and 3B, an optical actuator 30 according to a second embodiment of the present invention includes a base 31, a carrier 32, a reflective optical element, a first connecting structure 34, a second connecting structure 34' and an actuating component 35. That is, the second connecting structure 34' is symmetrically arranged with the first connecting structure 34. The structures and functions of the base 31, carrier 32, reflective optical element and actuating component 35 are the same as those of the base 21, carrier 22, reflective optical element 23 and actuating component 25 of the previous embodiment, so the detailed descriptions thereof will be omitted.

In the embodiment, the base 31 has at least one protrusion 311 and the protrusion 311 supports the first connection portion 341. The optical actuator 30 includes two connecting structures (the first connecting structure 34 and the second connecting structure 34'). Each of the connecting structures 34, 34' is a plate structure and has a first connecting portion 341 located at a central region thereof and two second connecting portions 342 located at two opposite sides thereof. The first connecting portion 341 is connected to a second side S2 of the carrier 32, and the second connecting portions 342 are connected to the base 31. In the embodiment, the carrier 32 and the connecting structures 34 can be integrally formed as a monolithic piece. That is, the first connecting portion 341 and the carrier 32 are integrally formed as a monolithic piece. Of course, they can also be connected by adhering or screwing. In addition, the first connecting structure 34 and the second connecting structure 34' can be connected to the base 31 by adhering or screwing, or they can be integrally formed as a monolithic piece. The rotation of the optical actuator 30 and the connection of the first connecting structure 34, the second connecting structure 34', the base 31 and the carrier 32 are the same as those of the previous embodiment, so the detailed description will be omitted.

Third Embodiment

Figure 4A:
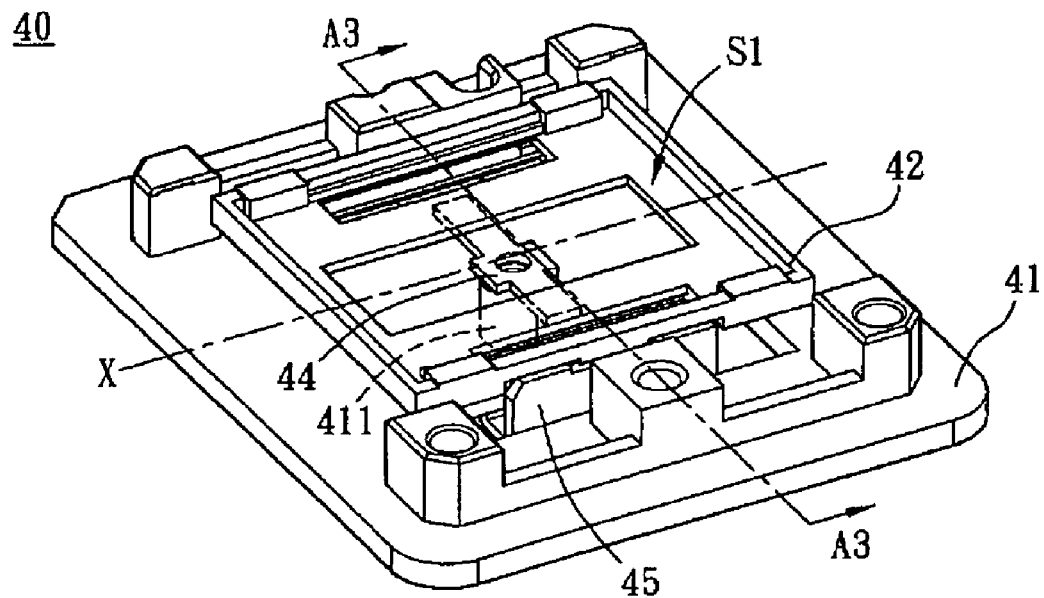
FIG. 4A is a schematic illustration showing an optical actuator according to a third embodiment of the present invention.
Figure 4B:
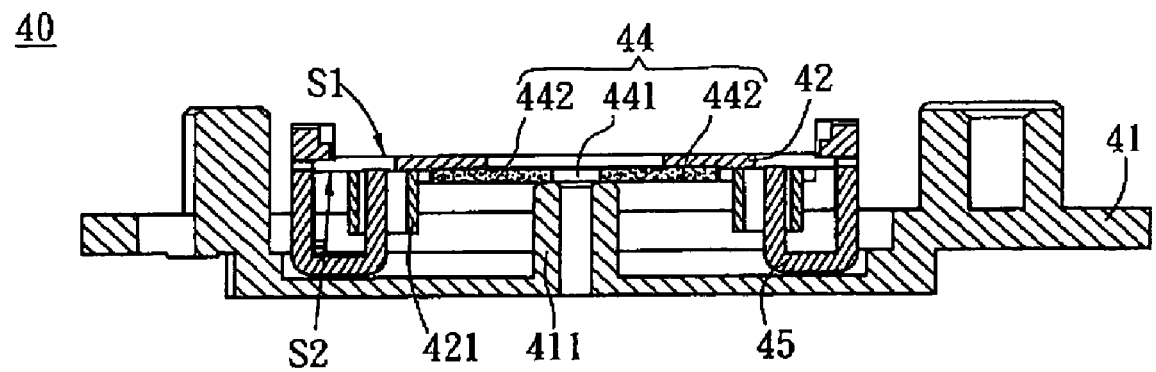
FIG. 4B is a sectional view of the optical actuator along a line A3-A3 of FIG. 4A.

With reference to FIGS. 4A and 4B, an optical actuator 40 according to a third embodiment of the present invention includes a base 41, a carrier 42, a reflective optical element, a connecting structure 44 and an actuating component 45. The connecting structure 44 is connected between the carrier 42 and a second side S2 of the base 41. The connecting structure 44 has a first connecting portion 441 located at a central regipn thereof and two second connecting portions 442 located at two opposite sides thereof. The first connecting portion 441 is connected to the base 41, and the second connecting portions 442 are connected to a second side S2 of the carrier 42. The base 41 has at least one protrusion 411 and the protrusion 411 supports the first connection portion 441. The connection of the connecting structure 44, the carrier 42 and the base 41 is the same as that of the connecting structure 24, the carrier 22 and the base 21 of the first embodiment, so the detailed description thereof will be omitted.

The structures and functions of the base 41, carrier 42, reflective optical element and actuating component 45 are the same as those of the base 21, carrier 22, reflective optical element 23 and actuating component 25 of the first embodiment, respectively, so the detailed descriptions thereof will be omitted. The connecting structure 44 of the optical actuator 40 can not only support the carrier 42 but also carry out the rotation of the carrier 42.

In summary, the optical actuator of the present invention has a connecting structure, which includes a first connecting portion and two second connecting portions, for connecting the base and a second side of the carrier. Thus, the axial line of the carrier is substantially perpendicular to the connecting structure. Compared with the prior art, the connecting structure can withstand the torque of the rotating carrier so as to prevent the deformation as the conventional axles, thereby improving the stability of the image quality.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. An optical actuator comprising:
   a base having at least one protrusion;
   a carrier having a first side and a second side opposite to the first side;
   a reflecting optical element disposed on the first side of the carrier;
   a first connecting structure having a first connecting portion located at a central region thereof and two second connecting portions located at two opposite sides thereof, wherein the first connecting portion and the second connecting portions connect the base with the second side of the carrier, and the protrusion supports the first connection portion;

an actuating component disposed on the base and driving the carrier rotating along an axial line, wherein the axial line is substantially perpendicular to the connecting structure; and a second connecting structure symmetrically arranged with the first connecting structure.

2. The optical actuator according to claim 1, wherein the first connecting portion is connected to the second side of the carrier, and the second connecting portions are connected to the base.

3. The optical actuator according to claim 2, wherein the first connecting portion is connected to the second side of the carrier by adhering or screwing, or the first connecting portion and the carrier are integrally formed as a monolithic piece.

4. The optical actuator according to claim 2, wherein the second connecting portions are fixed to the base.

5. The optical actuator according to claim 1, wherein the first connecting portion is connected to the base, and the second connecting portions are connected to the second side of the carrier.

6. The optical actuator according to claim 5, wherein the first connecting portion is fixed to the base.

7. The optical actuator according to claim 5, wherein the second connecting portions and the carrier are integrally formed as a monolithic piece.

8. The optical actuator according to claim 1, wherein the connecting structure is a plate structure or an elastic piece.

9. The optical actuator according to claim 1, wherein the actuating component comprises a voice coil motor or a piezoelectric actuator.

10. A projection system comprising:
an optical actuator comprising:
a base having at least one protrusion,
a carrier having a first side and a second side opposite to the first side,
an optical element disposed at the first side of the carrier,
a first connecting structure having a first connecting portion located at a central region thereof and two second connecting portions located at two opposite sides thereof, wherein the first connecting portion and the second connecting portions connect the base with the second side of the carrier, and the protrusion supports the first connection portion, an actuating component disposed on the base and driving the carrier rotating along an axial line, wherein the axial line is substantially perpendicular to the connecting structure; and a projecting lens module disposed corresponding to the optical actuator; and a second connecting structure symmetrically arranged with the first connecting structure.

11. The projection system according to claim 10, wherein the first connecting portion is connected to the second side of the carrier, and the second connecting portions are connected to the base.

12. The projection system according to claim 10, wherein the first connecting portion is connected to the second side of the carrier by adhering or screwing, or the first connecting portion and the carrier are integrally formed as a monolithic piece.

13. The projection system according to claim 11, wherein the second connecting portions are fixed to the base.

14. The projection system according to claim 10, wherein the first connecting portion is connected to the base, and the second connecting portions are connected to the second side of the carrier.

15. The projection system according to claim 14, wherein the first connecting portion is fixed to the base.

16. The projection system according to claim 14, wherein the second connecting portions and the carrier are integrally formed as a monolithic piece.

17. The projection system according to claim 10, wherein the connecting structure is a plate structure or an elastic piece.

18. The projection system according to claim 10, wherein the actuating component comprises a voice coil motor or a piezoelectric actuator.

* * * * *